US011297174B2

(12) United States Patent
Jeong et al.

(10) Patent No.: US 11,297,174 B2
(45) Date of Patent: Apr. 5, 2022

(54) FOLDED MODULE AND PORTABLE ELECTRONIC DEVICE INCLUDING THE SAME

(71) Applicant: Samsung Electro-Mechanics Co., Ltd., Suwon-si (KR)

(72) Inventors: Yeong Min Jeong, Suwon-si (KR); Kyung Ho Lee, Suwon-si (KR); Chui Kyu Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 57 days.

(21) Appl. No.: 16/776,894

(22) Filed: Jan. 30, 2020

(65) Prior Publication Data

US 2020/0404085 A1 Dec. 24, 2020

(30) Foreign Application Priority Data

Jun. 18, 2019 (KR) .......................... 10-2019-0072016

(51) Int. Cl.
*G06F 1/16* (2006.01)
*H04M 1/02* (2006.01)
*H04N 5/225* (2006.01)

(52) U.S. Cl.
CPC ........ *H04M 1/0264* (2013.01); *G06F 1/1616* (2013.01); *G06F 1/1686* (2013.01); *H04M 1/0214* (2013.01); *H04N 5/2252* (2013.01); *H04N 5/2254* (2013.01)

(58) Field of Classification Search
CPC . H04M 1/0264; H04M 1/0214; G06F 1/1616; G06F 1/1686; H04N 5/2254; H04N 5/2252

See application file for complete search history.

(56) References Cited

U.S. PATENT DOCUMENTS

| 10,284,780 | B2 * | 5/2019 | Goldenberg | ............. G03B 3/10 |
| 10,334,146 | B2 * | 6/2019 | Im | ...................... H04N 5/23287 |
| 10,372,022 | B2 * | 8/2019 | Avivi | ....................... G03B 5/06 |
| 10,488,631 | B2 * | 11/2019 | Bachar | .................. G02B 7/182 |

(Continued)

FOREIGN PATENT DOCUMENTS

| CN | 108398806 A | 8/2018 |
| CN | 207992659 U | 10/2018 |

(Continued)

OTHER PUBLICATIONS

Korean Office Action dated Nov. 17, 2020 in counterpart Korean Patent Application No. 10-2019-0072016 (8 pages in English and 6 pages in Korean).

(Continued)

*Primary Examiner* — Rockshana D Chowdhury
(74) *Attorney, Agent, or Firm* — NSIP Law

(57) ABSTRACT

A folded module includes a housing having an internal space and including a protruding wall protruding in a direction perpendicular to an optical axis direction; a rotation holder including a reflective member, and supported by an internal wall of the housing with a rotation plate interposed therebetween to be disposed in the internal space; and a stopper coupled to the protruding wall of the housing, and limiting movement of the rotation holder in an optical axis direction, and the stopper includes a separation prevention structure.

14 Claims, 17 Drawing Sheets

(56) References Cited

U.S. PATENT DOCUMENTS

| | | | |
|---|---|---|---|
| 10,534,153 B2* | 1/2020 | Shabtay | G02B 7/021 |
| 10,841,471 B1* | 11/2020 | Chang | G02B 13/0015 |
| 10,884,321 B2* | 1/2021 | Jerby | G02B 13/0035 |
| 2007/0133967 A1 | 6/2007 | Takahashi et al. | |
| 2012/0206820 A1 | 8/2012 | Kim et al. | |
| 2015/0146087 A1 | 5/2015 | Okuda | |
| 2016/0091778 A1 | 3/2016 | Kobayashi | |
| 2018/0203328 A1* | 7/2018 | Kang | H04N 5/23287 |
| 2018/0224665 A1 | 8/2018 | Im et al. | |
| 2018/0364450 A1 | 12/2018 | Lee et al. | |
| 2018/0367714 A1* | 12/2018 | Im | G02B 7/102 |
| 2019/0173987 A1* | 6/2019 | Sung | H04N 5/2254 |
| 2019/0361225 A1* | 11/2019 | Cho | H04N 5/23287 |

FOREIGN PATENT DOCUMENTS

| | | |
|---|---|---|
| CN | 109143528 A | 1/2019 |
| CN | 109151263 A | 1/2019 |
| JP | 2016-71079 A | 5/2016 |
| KR | 10-2006-0128123 A | 12/2006 |
| KR | 10-2007-0061394 A | 6/2007 |
| KR | 10-0818514 B1 | 3/2008 |
| KR | 10-2012-0092423 A | 8/2012 |
| KR | 10-2018-0137277 A | 12/2018 |

OTHER PUBLICATIONS

Chinese Office Action dated Jul. 5, 2021 issued in counterpart Chinese Patent Application No. 202010305160.2 (11 pages in English and 11 pages in Chinese).

* cited by examiner

FOLDED MODULE AND PORTABLE ELECTRONIC DEVICE INCLUDING THE SAME

CROSS-REFERENCE TO RELATED APPLICATION(S)

This application claims benefit under 35 USC § 119(a) of Korean Patent Application No. 10-2019-0072016 filed on Jun. 18, 2019 in the Korean Intellectual Property Office, the entire disclosure of which is incorporated herein by reference for all purposes.

BACKGROUND

1. Field

The following description relates to a folded module and a portable electronic device.

2. Description of Related Art

Cameras have been mounted in portable electronic devices such as smartphones, tablet PCs, laptop computers, and cameras for a mobile terminal device have been designed to include various functions, such as, an autofocusing function, an image stabilization function, and a zoom function. To implement a variety of functions, a structure of a camera module has become complex, and a size of a camera module has increased such that a size of a portable electronic device on which the camera module is mounted has also been increased. Also, when a lens or an image sensor is configured to directly move to perform image stabilization, a weight of a lens or an image sensor and also weights of other members to which the lens or the image sensor is attached need to be considered. A certain level of driving force may be required, which may increase power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a folded module including a housing including a protruding wall protruding in a direction perpendicular to an optical axis direction, a rotation holder comprising a reflective member, and supported by an internal wall of the housing with a rotation plate interposed therebetween to be disposed inside the housing, and a stopper coupled to the protruding wall, and being configured to limit movement of the rotation holder in the optical axis direction, wherein the stopper includes a separation prevention structure.

The stopper may include a contact portion in contact with the rotation holder, a curved portion extending from the contact portion and being curved to surround an upper portion of the protruding wall, and a trap portion extending from the curved portion in a direction opposite to a direction towards the contact portion, wherein the separation prevention structure is disposed in the contact portion or the trap portion.

The separation prevention structure may include a first fixed portion in which an end portion of the trap portion is curved towards the protruding wall and a first fixing groove provided in the protruding wall, and the first fixed portion is inserted into the first fixing groove.

The first fixed portion may be compressively adhered to the first fixing groove.

The separation prevention structure may include a second fixed portion in which an end portion of the contact portion is curved towards the protruding wall and a second fixing groove provided in the protruding wall, and the second fixed portion is inserted into the second fixing groove.

The second fixed portion may be compressively adhered to the second fixing groove.

The separation prevention structure may include a third fixed portion in which an end portion of the contact portion is inserted into the bottom of the housing.

The housing may include a third fixing groove in the bottom of the housing, and wherein the third fixed portion is compressively inserted into the third fixing groove.

The housing may include a third fixing groove in the bottom of the housing, and wherein the third fixed portion is configured to slide into and be coupled to the third fixing groove.

The third fixed portion and the third fixing groove may be coated with an adhesive and are bonded to each other.

The separation prevention structure may include the second fixed portion in which an end portion of the contact portion may be curved towards the protruding wall and the second fixing groove provided in the protruding wall, and the second fixed portion may be inserted into the second fixing groove.

The second fixed portion may be compressively adhered to the second fixing groove.

The separation prevention structure may include the third fixed portion in which an end portion of the contact portion is inserted into the bottom of the housing.

The housing may include the third fixing groove in the bottom of the housing, and wherein the third fixed portion is compressively coupled to the third fixing groove, or slides into and is coupled to the third fixing groove.

The separation prevention structure may include a first fixing groove provided in the protruding wall, and an end portion of the trap portion is curved to be inserted into the first fixing groove, and a second fixing groove provided in the protruding wall, and an end portion of the contact portion is curved to be inserted into the second fixing groove.

According to an aspect of the present disclosure, a camera module in the example embodiments may include the above-described folded module, and the camera module may be mounted on a portable terminal device.

Other features and aspects will be apparent from the following detailed description, the drawings, and the claims.

Figure 1:
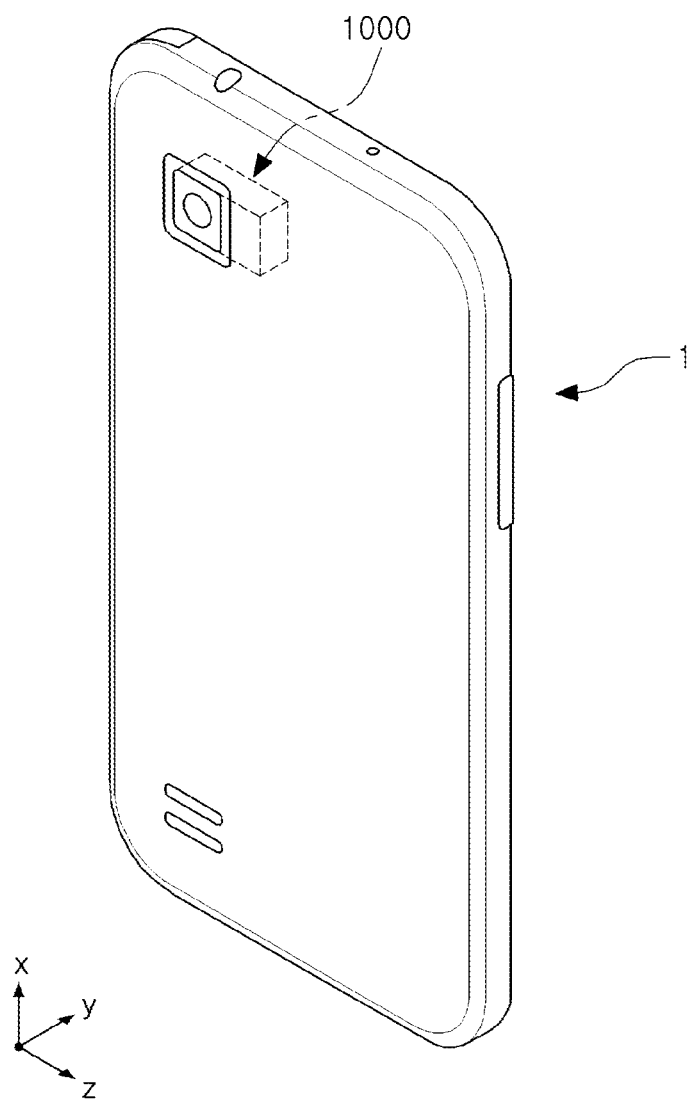
FIG. 1 is a diagram illustrating an example of a portable electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 is a diagram illustrating an example of a portable electronic device.

Referring to FIG. 1, a portable electronic device 1 may be implemented as a portable electronic device such as, for example, a mobile communication terminal device, a smartphone, a tablet PC, on which a camera module 1000 is mounted.

As illustrated in FIG. 1, the portable electronic device 1 may include a camera module 1000 to capture an image of an object.

In the example, the camera module 1000 may include a plurality of lenses, and an optical axis (Z axis) of the lenses may be disposed in a direction perpendicular to a thickness direction (Y axis direction), which is a direction from a front surface to a rear surface of the portable electronic device or a direction opposite to the above-described direction of the portable electronic device 1.

As an example, the optical axis (Z axis) of the plurality of lenses provided in the camera module 1000 may be formed in a width direction or a length direction (X axis direction or Z axis direction) of the portable electronic device 1.

Accordingly, even when the camera module 1000 includes functions such as, for example, an autofocusing (AF) function, a zoom function, an optical image stabilization (OIS) function, a thickness of the portable electronic device 1 may not increase. Thus, the portable electronic device 1 may have a reduced size.

The camera module 1000 in the example may include at least one of an AF function, a zoom function, and an OIS function.

The camera module 1000 including an AF function, a zoom function, an OIS function, and other functions may include various components. Accordingly, a size of the camera module 1000 may increase as compared to a general camera module.

When a size of the camera module 1000 increases, it may be difficult to reduce a size of the portable electronic device 1 on which the camera module 1000 is mounted.

For example, in a camera module, an increased number of lenses may be provided and stacked to perform a zoom function, and when a plurality of lenses are stacked in a thickness direction of a portable electronic device, a thickness of the portable electronic device may increase due to the number of stacked lenses. Accordingly, unless a thickness of the portable electronic device is increased, it may be difficult to sufficiently secure the number of stacked lenses, which may adversely impact the zoom function of the camera.

Also, to implement an AF function and an OIS function, it may be necessary to install an actuator moving a lens group in an optical axis direction or a direction perpendicular to an optical axis direction. When an optical axis (Z axis) of the lens group is formed in a thickness direction of the portable electronic device, the actuator for moving the lens group may also need to be installed in a thickness direction of the portable electronic device. Accordingly, a thickness of the portable electronic device may increase.

However, in the camera module 1000 in the example, as an optical axis (Z axis) of a plurality of lenses is disposed in a direction perpendicular to a thickness direction of the portable electronic device 1, even when the camera module 1000 including an AF function, a zoom function, and an OIS function is mounted, the portable electronic device 1 may have a reduced size.

Figure 2:
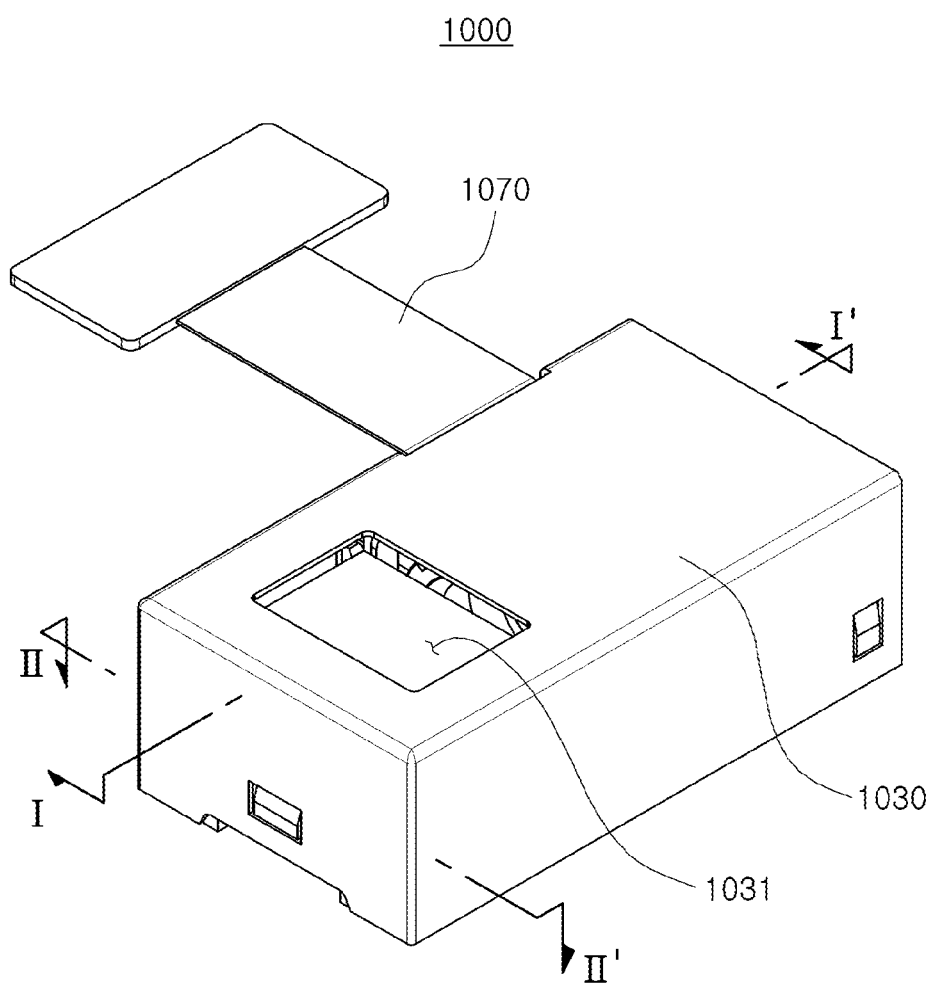
FIG. 2 is a diagram illustrating an example of a camera module.
Figure 3A:
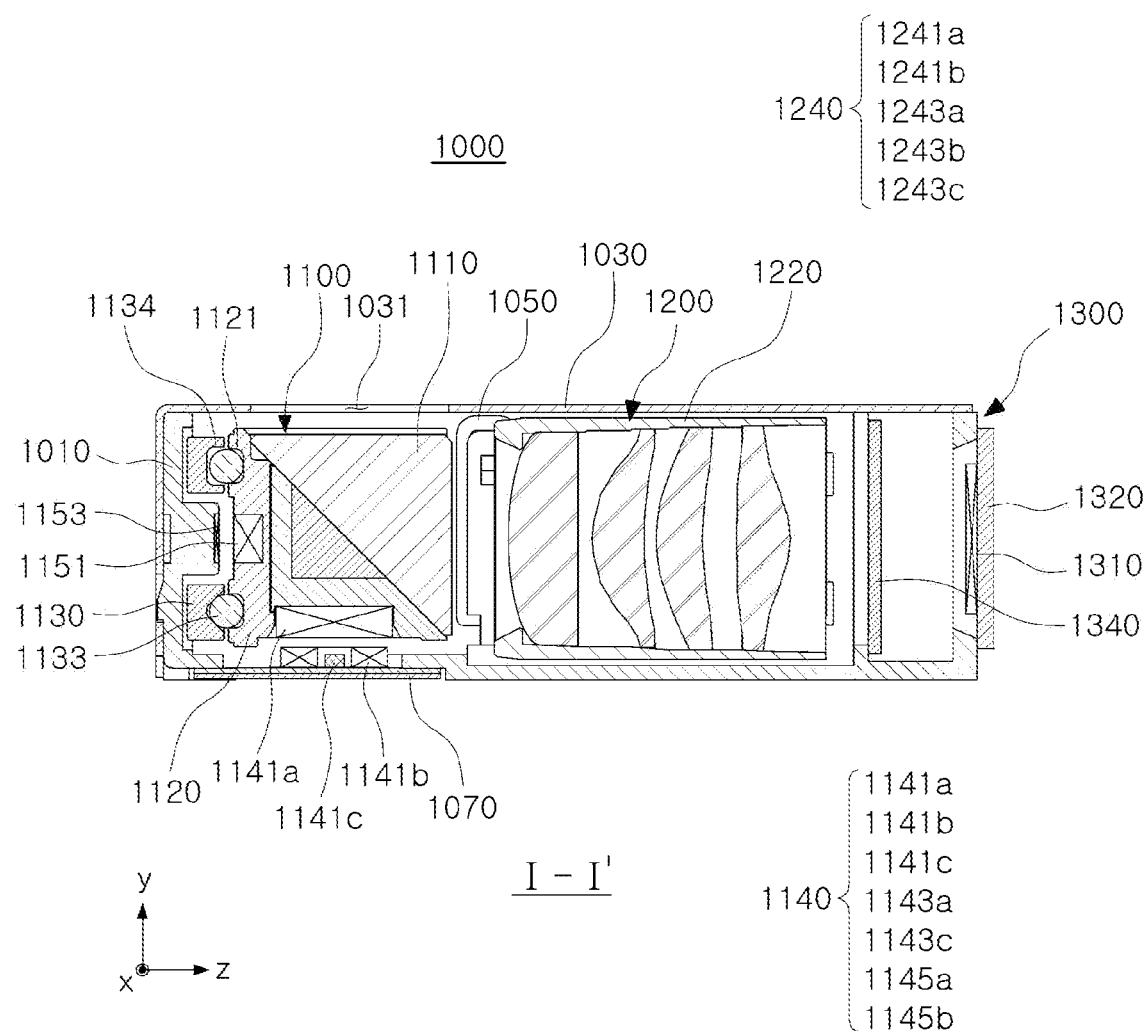
FIGS. 3A and 3B are diagrams illustrating examples of a camera module.
Figure 3B:
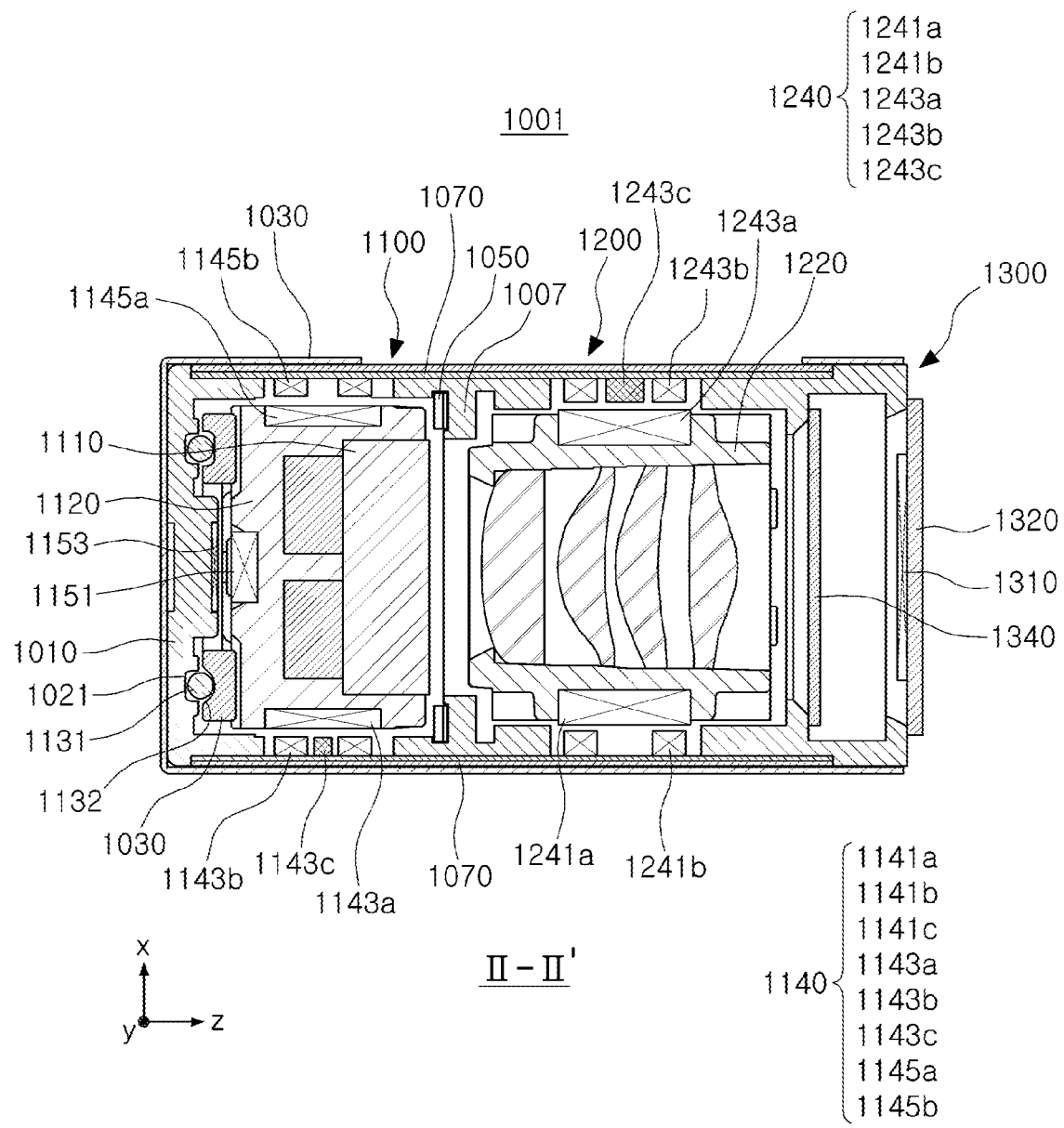
Figure 4:
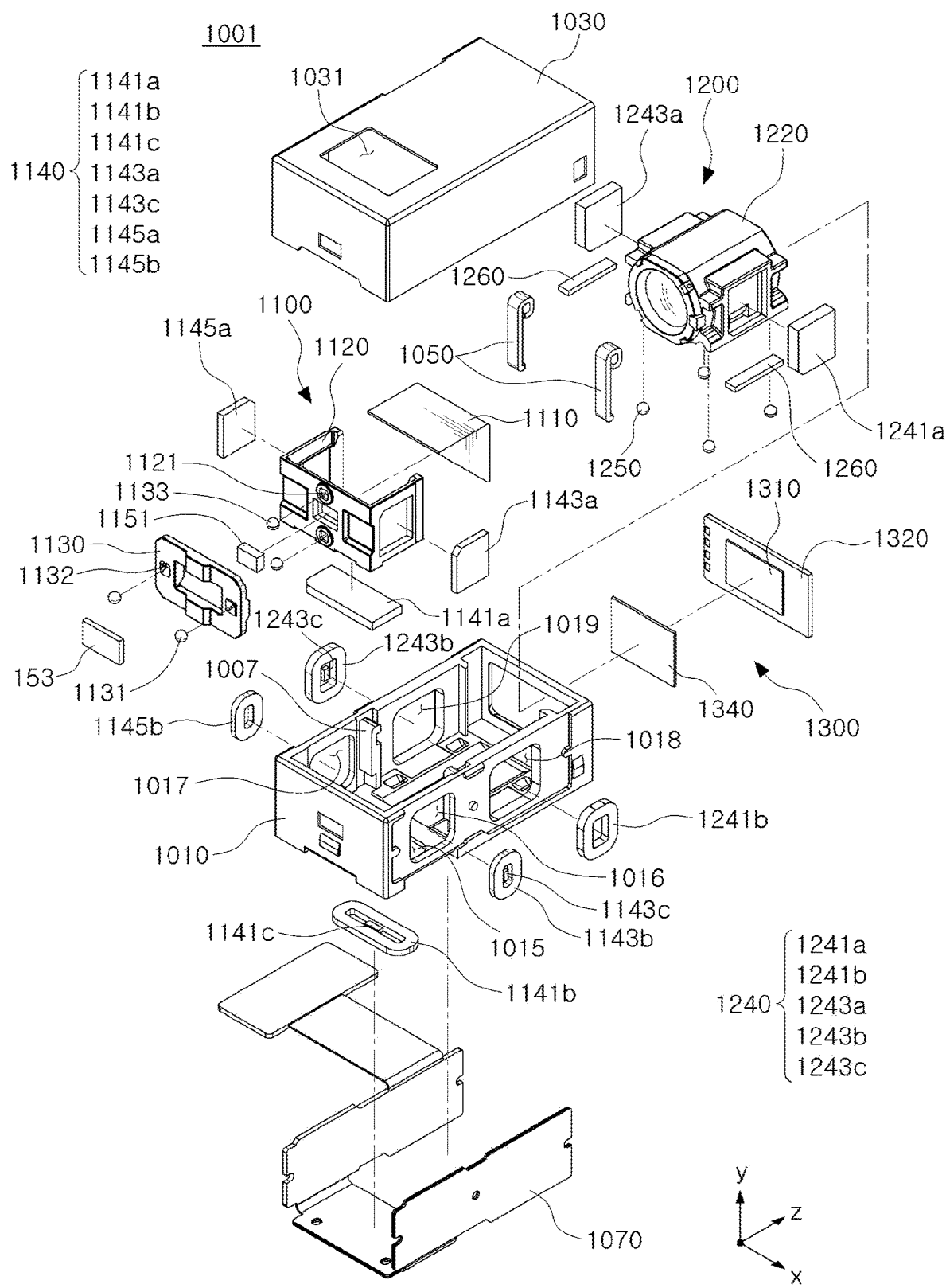
FIG. 4 is a diagram illustrating an example of a camera module.
Figure 5:
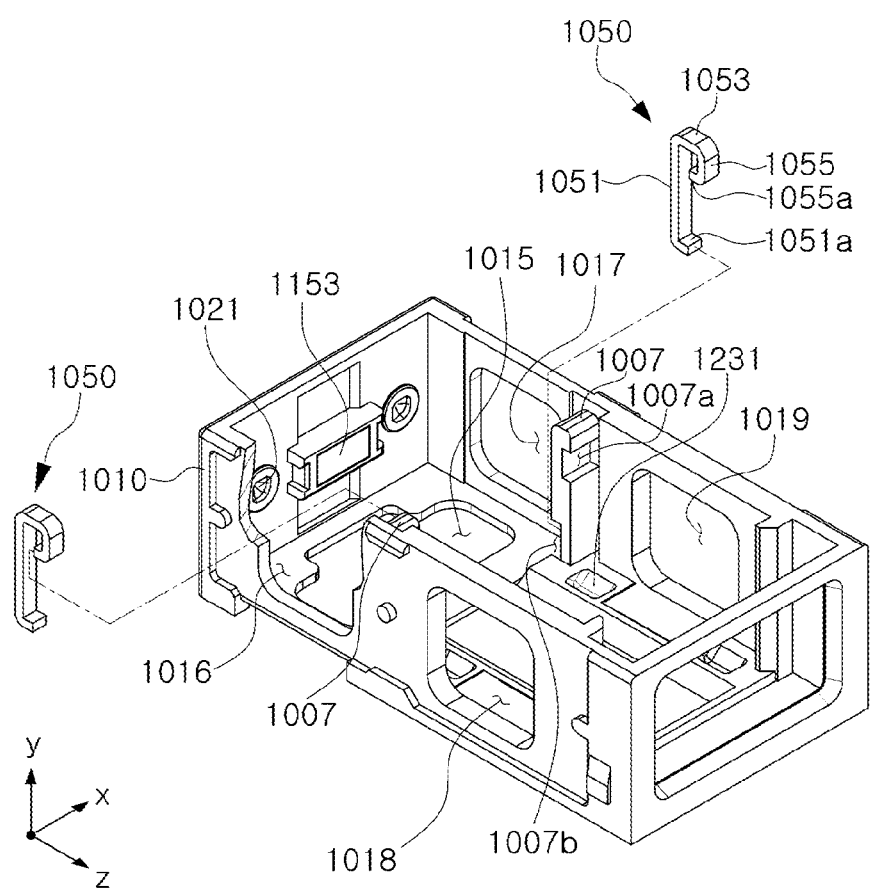
FIG. 5 is a diagram illustrating an example configuration in which a stopper is coupled to a housing of a camera module.
Figure 6:
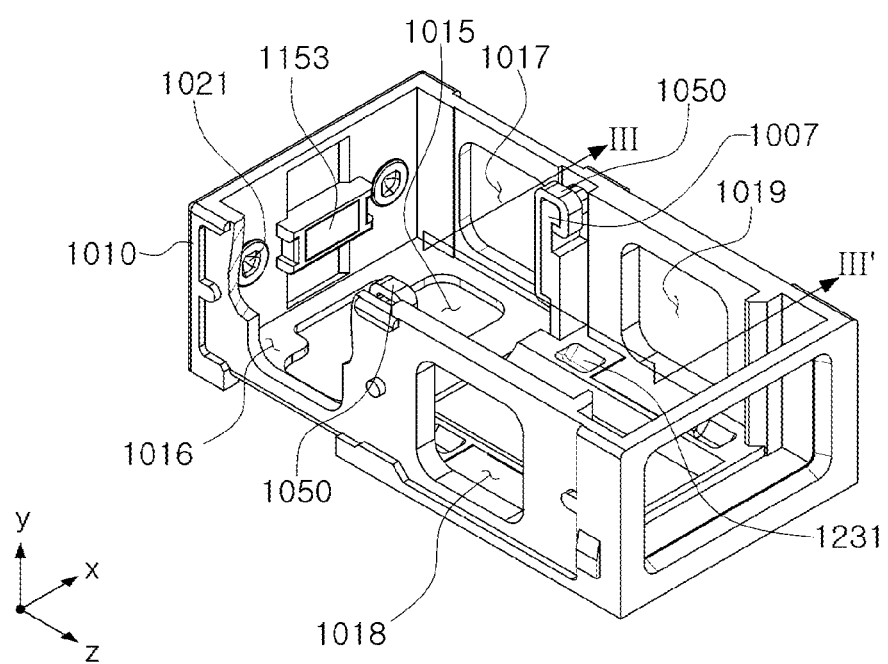
FIG. 6 is a diagram illustrating an example configuration in which a stopper is coupled to a housing of a camera module.

FIG. 2 is a diagram illustrating an example of a camera module. FIGS. 3A and 3B are cross-sectional diagrams illustrating examples of a camera module.

Referring to FIGS. 2, 3A, and 3B, a camera module 1000 may include a reflective module 1100, a lens module 1200, and an image sensor module 1300 provided in a housing 1010.

The reflective module 1100 may be configured to alter a moving direction of light. As an example, a moving direction of light incident through an opening 1031 (see FIG. 3A) of a cover 1030 covering the camera module 1000 from an upper portion may be altered to a direction of the lens module 1200 by the reflective module 1100. To this end, the reflective module 1100 may include a reflective member 1110 reflecting light.

A path of light incident through the opening 1031 may be altered to be directed to the lens module 1200 by the reflective member 1110. For example, a path of light incident in a thickness direction (Y axis direction) of the camera module 1000 may be altered to match an optical axis (Z axis) direction by the reflective member 1110.

The lens module 1200 may include a plurality of lenses, and the light of which a moving direction is altered by the reflective member 1110 may pass through the plurality of lenses. The image sensor module 1300 may include an image sensor 1310 converting the light passing through the plurality of lenses into an electrical signal, and a printed circuit board 1320 on which the image sensor 1310 is mounted. The image sensor module 1300 may further include an optical filter 1340 filtering the light incident from the lens module 1200. In an example, the optical filter 1340 may be implemented as an infrared shielding filter.

In an internal space of the housing 1010, the reflective module 1100 may be provided in a front region of the lens module 1200, and the image sensor module 1300 may be provided in a rear region of the lens module 1200.

Referring to FIGS. 2 to 10, a camera module 1000 in the example may include a reflective module 1100, a lens module 1200, and an image sensor module 1300 provided in a housing 1010.

The reflective module 1100, the lens module 1200, and the image sensor module 1300 may be provided in a housing 1010 in order from one side to the other side. The housing 1010 may include an internal space in which the reflective module 1100, the lens module 1200, and the image sensor module 1300 are disposed. In an example, the printed circuit board 1320 including the image sensor module 1300 may be attached externally on the housing 1010. For example, as illustrated in the diagram, the housing 1010 may be provided in an integrated form to include both the reflective module 1100 and the lens module 1200 in the internal space of the housing 1010. Other arrangement of these components, such as, for example, separate housings in which the reflective module 1100 and the lens module 1200 are respectively disposed, and interconnected with each other may be used without departing from the spirit and scope of the illustrative examples described.

The housing 1010 may be covered by a cover 1030 such that the internal space of the housing 1010 is not exposed.

The cover 1030 may include an opening 1031 through which light is incident, and a moving direction of light incident through the opening 1031 may be altered by the reflective module 1100, and the light may be incident to the lens module 1200. The cover 1030 may be provided in an integrated form to entirely cover the housing 1010. In another example, a separate cover members may be provided to cover the reflective module 1100 and the lens module 1200.

In an example, the reflective module 1100 may include a reflective member 1110 reflecting light. Light incident to the lens module 1200 may pass through a plurality of lenses, may be converted into an electrical signal by an image sensor 1310, and may be stored.

The housing 1010 may include the reflective module 1100 and the lens module 1200 in the internal space of the housing 1010. Accordingly, the internal space of the housing 1010 may be divided into a space in which the reflective module 1100 is disposed and a space in which the lens module 1200 is disposed by a protruding wall 1007. In an example, the reflective module 1100 may be disposed on a front side of the protruding wall 1007, and the lens module 1200 may be disposed on a rear side of the protruding wall 1007. The protruding wall 1007 may be configured to protrude towards an internal space of the housing 1010 from a side wall on both sides of the housing 1010. Accordingly, the protruding wall 1007 may protrude in an X axis direction, a direction perpendicular to an optical axis direction, in the housing 1010.

In the reflective module 1100 provided on the front side, a rotation holder 1120 may be configured to be adhered to and supported by an internal wall of the housing 1010 by attractive force of a pulling yoke 1153 provided on the internal wall of the housing 1010 and a pulling magnet 1151 provided on the rotation holder 1120. In another example, although not illustrated, a pulling magnet may be provided in the housing 1010, and a pulling yoke may be provided in a rotation folder 1120. In the description below, the example illustrated in the diagram will be described for ease of description.

A first ball bearing 1131, a rotation plate 1130, and a second ball bearing 1133 may be provided between an internal wall of the housing 1010 and the rotation holder 1120. The first ball bearing 1131 and the second ball bearing 1133 may be partially inserted into and adhered to seating grooves 1132, 1134, 1021, and 1121. Accordingly, when the rotation holder 1120 and the rotation plate 1130 are inserted into the internal space of the housing 1010, a space may be formed between the rotation holder 1120 and the protruding wall 1007, and after the rotation holder 1120 is mounted on the housing 1010, the rotation holder 1120 may be adhered to the internal wall of the housing 1010 by attractive force of the pulling yoke and the pulling magnet. Accordingly, a space may be formed between the rotation holder 1120 and the protruding wall 1007.

In an example, a stopper 1050 having a hook shape and that is configured to support the rotation holder 1120 and to be inserted into the protruding wall 1007 may be provided (the rotation holder 1120 may be fixed by attractive force applied by the pulling magnet 1151 and the pulling yoke 1153 when the stopper 1050 is not provided). The stopper 1050 may be configured to have a hook shape, and a hook portion may be caught by an upper portion of the protruding wall 1007. When the rotation holder 1120 is separated from the housing 1010 by external force or for other reasons, the stopper 1050 provided on the protruding wall 1007 may prevent the rotation holder 1120 from being separated from the housing 1010.

In an example, the stopper 1050 may be provided on each of the protruding walls 1007 protruding from both sides of the housing 1010. A space may be provided between the stopper 1050 and the rotation holder 1120 for smooth rotation of the rotation holder 1120. In an example, the stopper 1050 may include a contact portion 1051 in contact with the rotation holder 1120, a curved portion 1053 curved to surround an upper portion of the protruding wall 1007, a trap portion 1055 extending in a direction opposite to a direction of the contact portion 1051 from the curved portion 1053.

The stopper 1050 may need to maintain a fixed state onto the protruding wall 1007 against impacts caused by repeated contact between the stopper 1050 and the rotation holder 1120. Accordingly, a separation prevention structure that enables the stopper 1050 to be firmly fixed to the protruding wall 1007 may be provided. The separation prevention structure may include a first fixed portion 1055a, a second fixed portion 1051a, or a third fixed portion 1051b provided on the stopper 1050, and may include a first fixing groove 1007a, a second fixing groove 1007b, or a third fixing groove 1008 to which the first fixed portion 1055a, the second fixed portion 1051a, or the third fixed portion 1051b are fixed.

Figure 7:
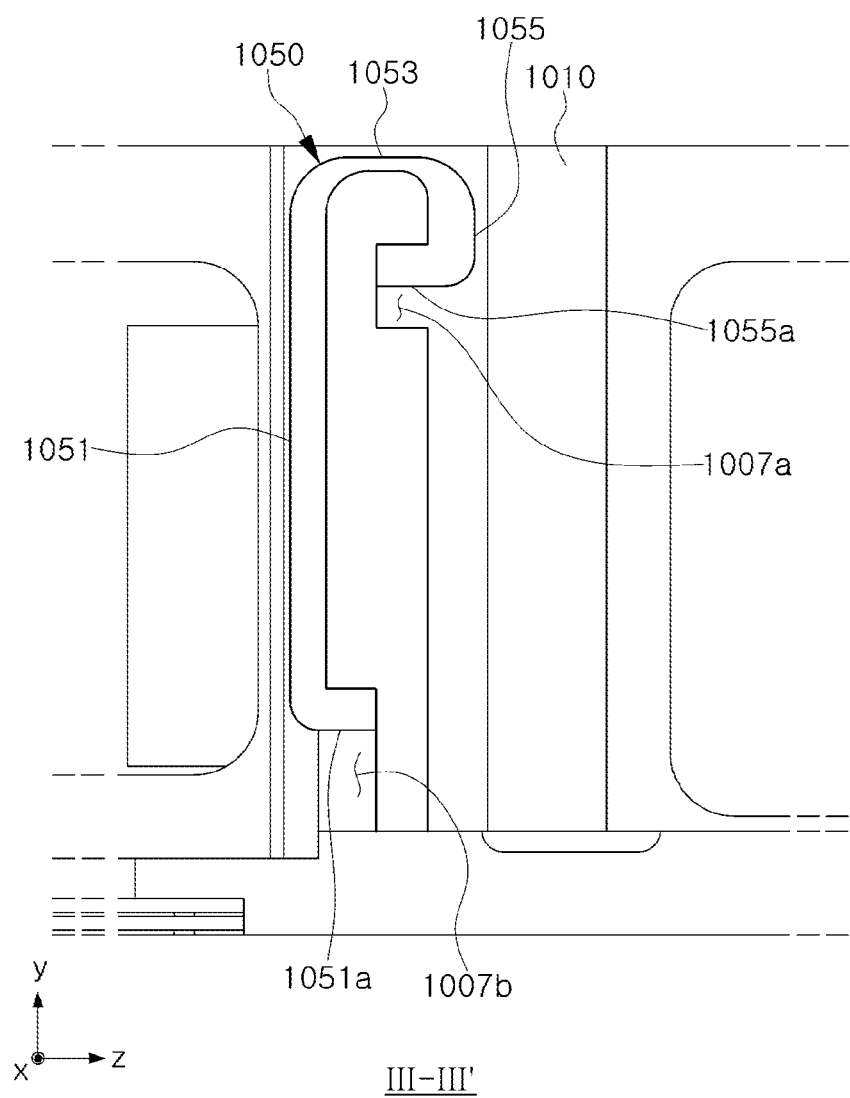
FIG. 7 is a diagram illustrating an example configuration in which a stopper is coupled to a housing.

Referring to FIG. 7, the separation prevention structure may include the first fixed portion 1055a and the second fixed portion 1051a, and the first fixing groove 1007a and the second fixing groove 1007b to which the first fixed portion 1055a and the second fixed portion 1051a are fixed, respectively.

Accordingly, the stopper 1050 may include the first fixed portion 1055a in which an end portion of the trap portion 1055 is curved towards the protruding wall 1007, and the second fixed portion 1051a in which an end portion of the contact portion 1051 is curved towards the protruding wall 1007. Also, the protruding wall 1007 may include the first fixing groove 1007a into which the first fixed portion 1055a is inserted, and the second fixing groove 1007b into which the second fixed portion 1051a is inserted. The first fixed portion 1055a and the second fixed portion 1051a may be formed by curving end portions of the contact portion 1051 and the trap portion 1055 into the first fixing groove 1007a and the second fixing groove 1007b using a jig (not illustrated), respectively. Accordingly, the first fixed portion 1055a and the second fixed portion 1051a may be compressively coupled to and adhered to the first fixing groove 1007a and the second fixing groove 1007b, respectively.

Figure 8:
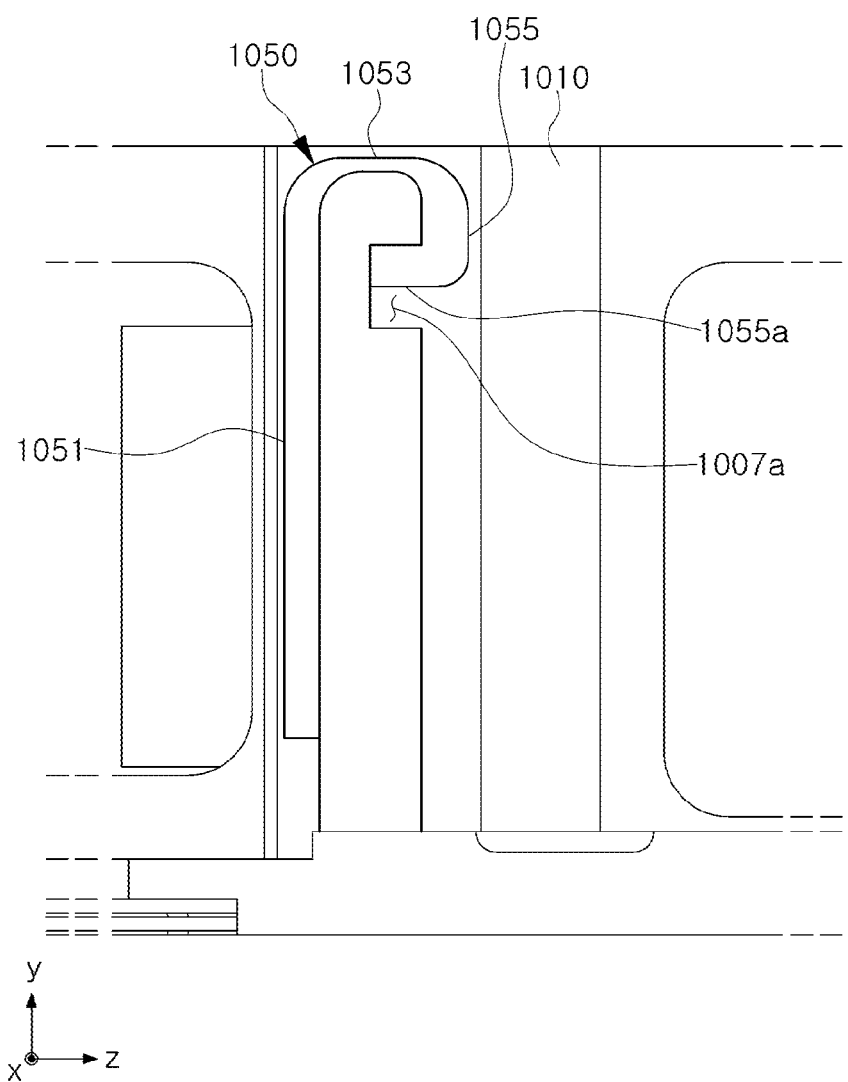
FIGS. 8 to 11 are diagrams illustrating an example configuration in which a stopper is coupled to a housing.

Referring to FIG. 8, a separation prevention structure may include a first fixed portion 1055a and a first fixing groove 1007a to which the first fixed portion 1055a is fixed. In an example, the separation prevention structure may not include the second fixed portion 1051a and the second fixing groove 1007b.

Accordingly, a stopper 1050 may include the first fixed portion 1055a in which an end portion of a trap portion 1055 is curved towards a protruding wall 1007, and the protruding wall 1007 may include the first fixing groove 1007a into which the first fixed portion 1055a is inserted. In the first fixed portion 1055a, an end portion of the trap portion 1055 is curved into the first fixing groove 1007a using a jig (not illustrated). Accordingly, the first fixed portion 1055a may be compressively coupled to and adhered to the first fixing groove 1007a.

Figure 9:
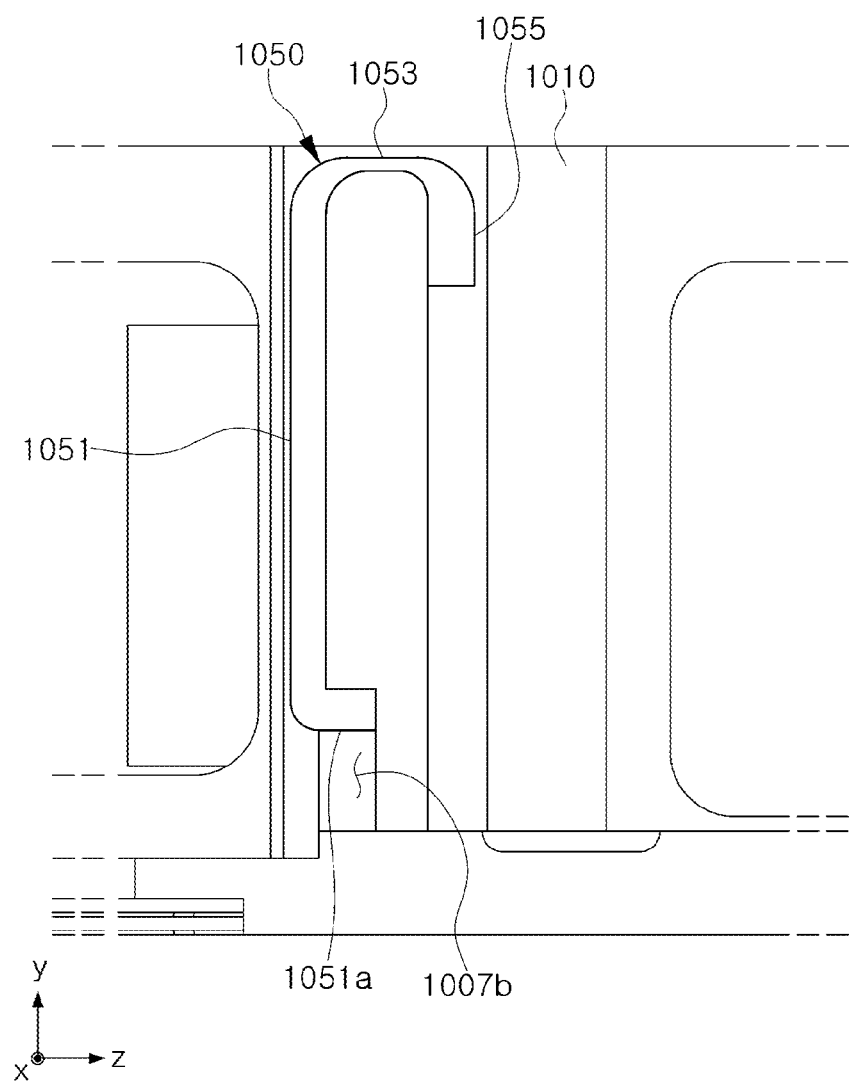

Referring to FIG. 9, a separation prevention structure may include a second fixed portion 1051a and a second fixing groove 1007b to which the second fixed portion 1051a is fixed. In an example, the separation prevention structure may not include the first fixed portion 1055a and the first fixing groove 1007a.

Accordingly, the stopper 1050 may include the second fixed portion 1051a in which an end portion of a contact portion 1051 is curved towards a protruding wall 1007, and the protruding wall 1007 may include the second fixing groove 1007b into which the second fixed portion 1051a is inserted. The second fixed portion 1051a may be formed by curving an end portion of the contact portion 1051 into the second fixing groove 1007b using a jig (not illustrated). Accordingly, the second fixed portion 1051a may be compressively coupled to and adhered to the second fixing groove 1007b.

Figure 10:
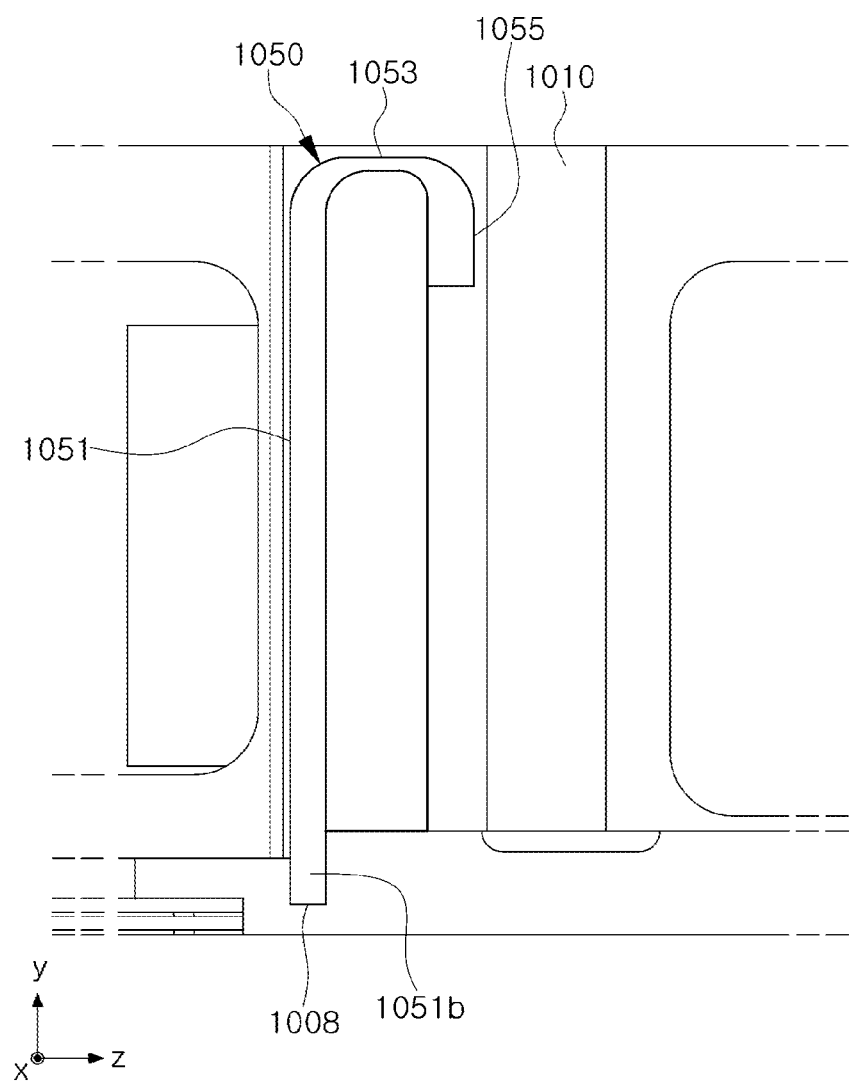

Referring to FIG. 10, a separation prevention structure may include a third fixed portion 1051b and a third fixing groove 1008 to which the third fixed portion 1051b is fixed. In an example, the first fixed portion 1055a and the second fixed portion 1051a, and the first fixing groove 1007a and the second fixing groove 1007b to which the first fixed portion 1055a and the second fixed portion 1051a are fixed may not be provided.

Accordingly, a stopper 1050 may include the third fixed portion 1051b in which an end portion of a contact portion 1051 extends into an internal region of a bottom of a housing 1010, and the third fixing groove 1008 into which the third fixed portion 1051b is inserted may be provided on the bottom of the housing 1010. The third fixed portion 1051b may be inserted into the third fixing groove 1008 by being compressively coupled to the third fixing groove 1008 or by sliding to and being coupled to the third fixing groove 1008. When the third fixed portion 1051b is coupled to the third fixing groove 1008 by sliding, the third fixing groove 1008 may be coated with an adhesive and may be bonded to and coupled to the third fixed portion 1051b.

Figure 11:
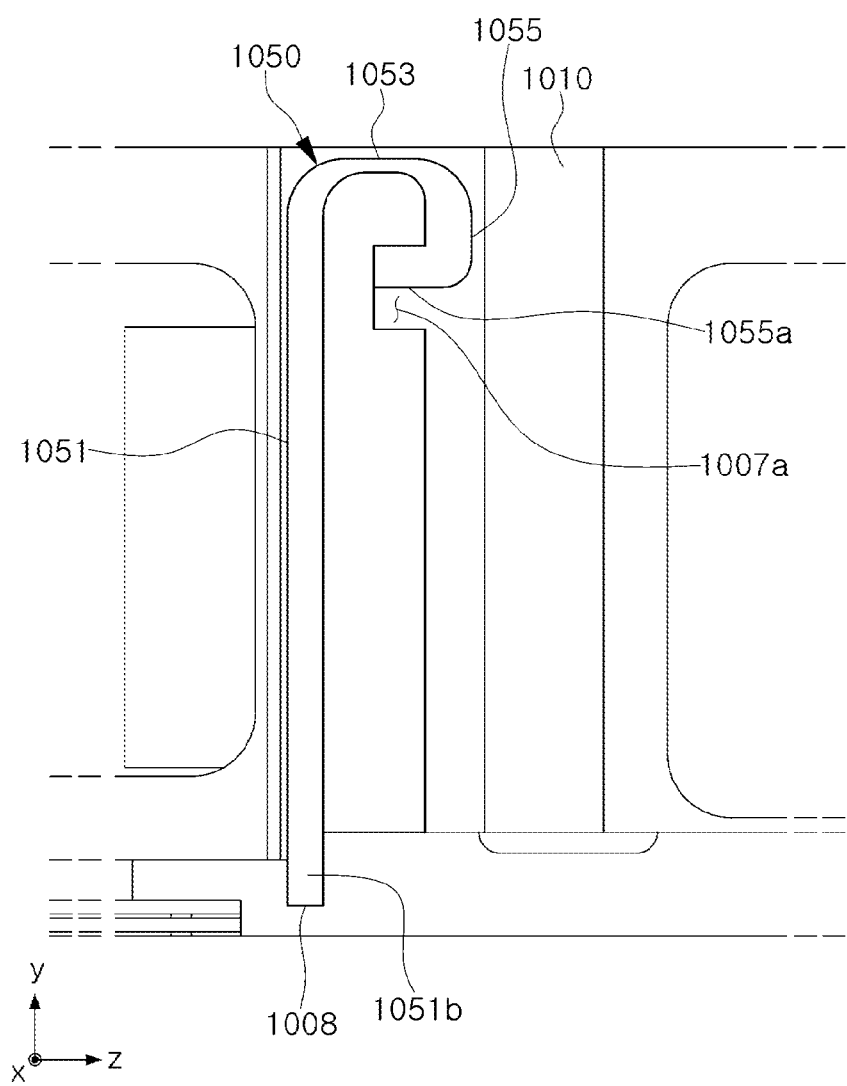
Figure 12:
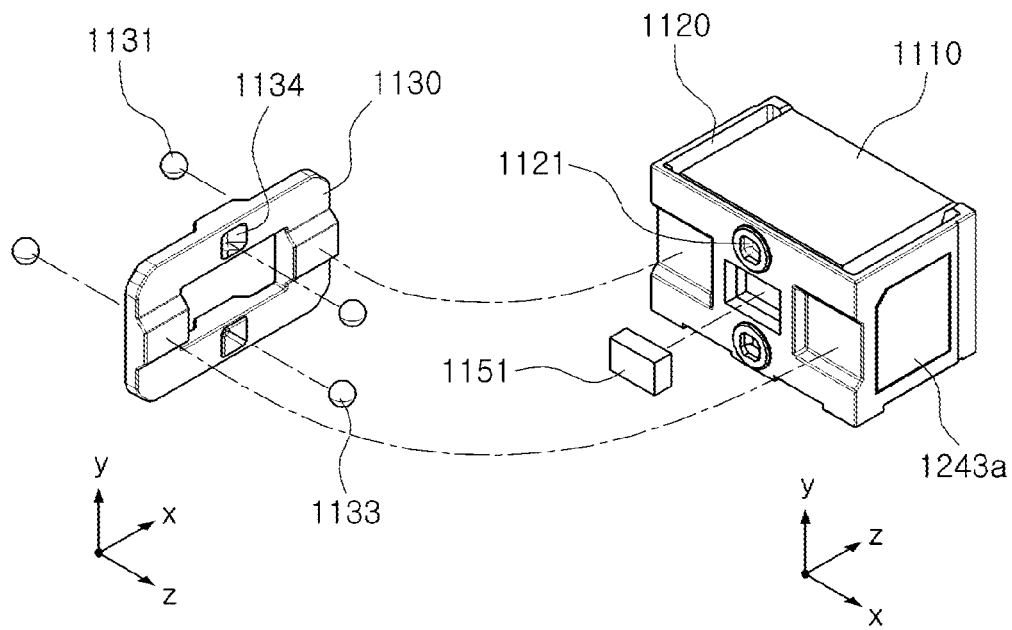
FIG. 12 is a diagram illustrating an example of a rotation plate and a rotation holder of a camera module.
Figure 13:
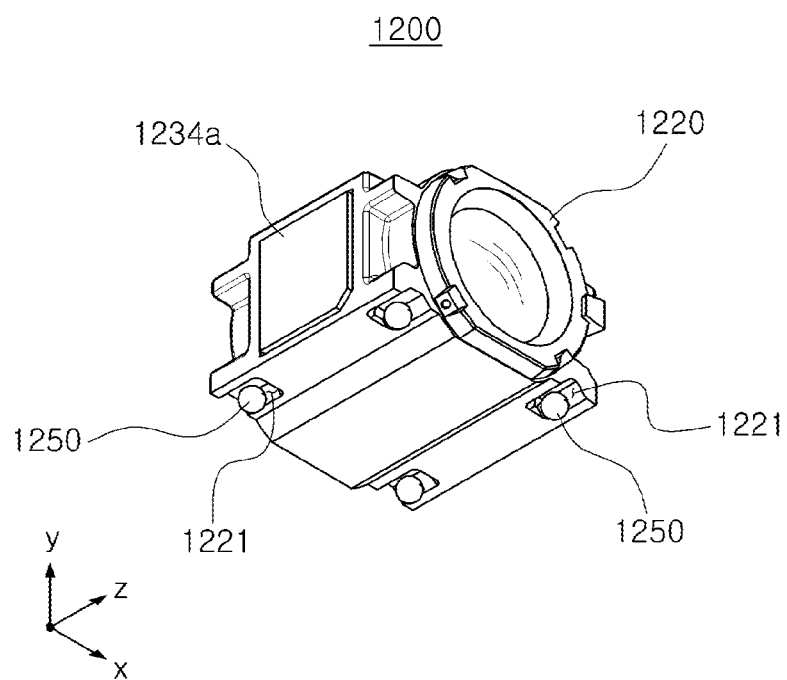
FIG. 13 is a diagram illustrating an example of a lens holder of a camera module.
Figure 14:
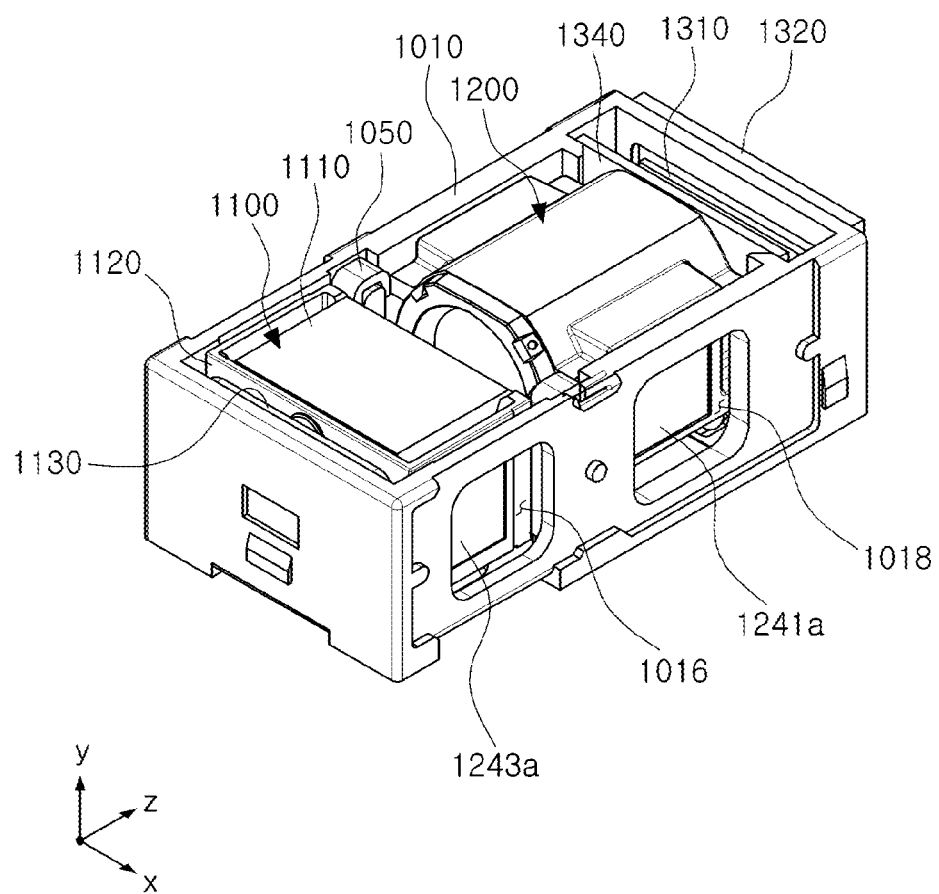
FIG. 14 is a diagram illustrating an example of a combination of components of a camera module without a cover.
Figure 15:
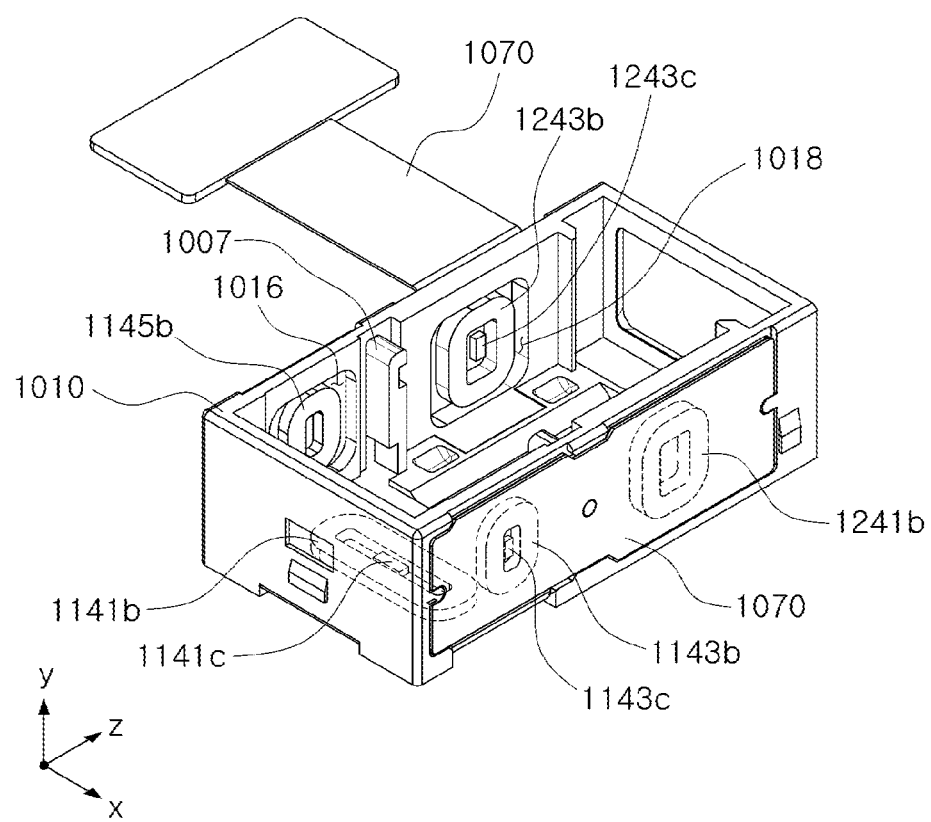
FIG. 15 is a diagram illustrating an example configuration in which a housing is combined with a substrate in a camera module.
Figure 16:
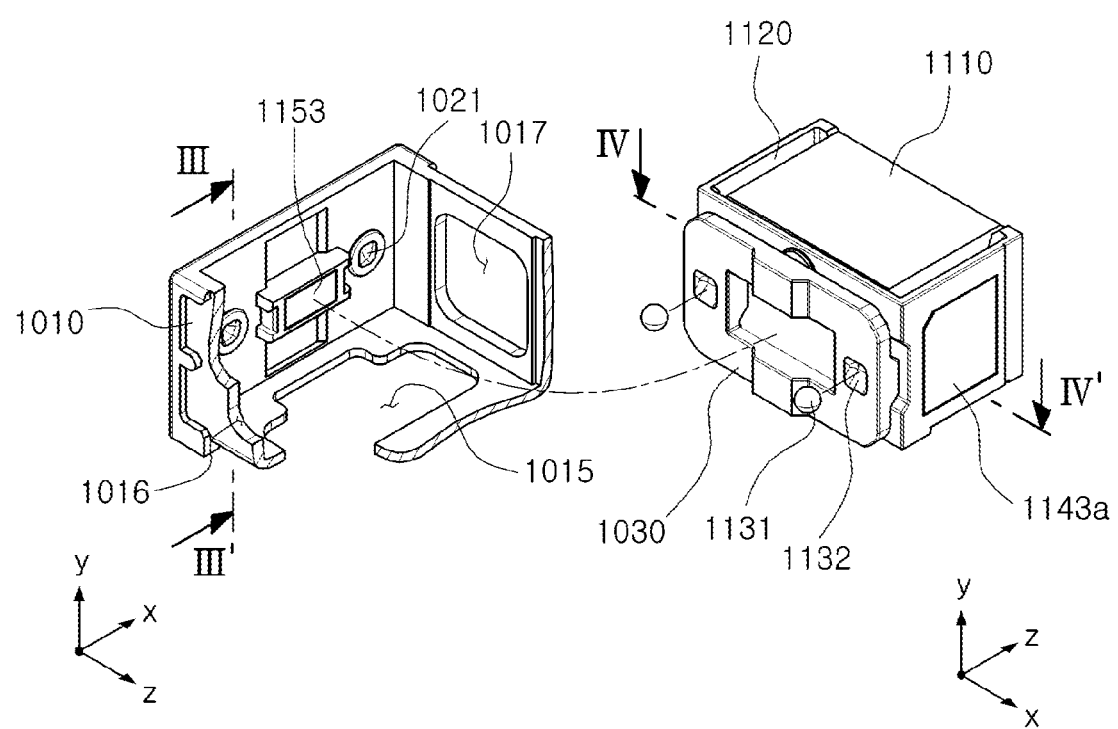
FIG. 16 is an diagram illustrating an example of a housing and a rotation holder of a camera module.

Referring to FIG. 11, a separation prevention structure may include a first fixed portion 1055a and a third fixed portion 1051b, and a first fixing groove 1007a and a third fixing groove 1008 to which the first fixed portion 1055a and the third fixed portion 1051b are fixed. In the separation prevention structure, the second fixed portion 1051a and the second fixing groove 1007b may not be provided.

Accordingly, a stopper 1050 may include the first fixed portion 1055a in which an end portion of a trap portion 1055 is curved towards a protruding wall 1007, and the third fixed portion 1051b in which an end portion of a contact portion 1051 extends to an internal region of a bottom of a housing 1010. The protruding wall 1007 may include the first fixing groove 1007a into which the first fixed portion 1055a is inserted, and the third fixing groove 1008 into which the third fixed portion 1051b is inserted may be provided on the bottom of the housing 1010.

In the first fixed portion 1055a, an end portion of the trap portion 1055 may be curved into the first fixing groove 1007a using a jig (not illustrated). Accordingly, the first fixed portion 1055a may be compressively coupled to and adhered to the first fixing groove 1007a.

The third fixed portion 1051b may be inserted into the third fixing groove 1008 by being compressively coupled to the third fixing groove 1008 or by sliding to and being coupled to the third fixing groove 1008. When the third fixed portion 1051b is coupled to the third fixing groove 1008 by sliding, the third fixing groove 1008 may be coated with an adhesive and may be bonded to and coupled to the third fixed portion 1051b.

Embodiments of the separation prevention structure are not limited to the examples illustrated in FIGS. 7 to 11, and the examples of the separation prevention structure illustrated in FIGS. 7 to 11 may be applied interchangeably.

The housing 1010 may include a first driving portion 1140 and a second driving portion 1240 to drive the reflective module 1100 and the lens module 1200, respectively. The first driving portion 1140 may include a plurality of coils 1141b, 1143b, and 1145b for driving the reflective module 1100, and the second driving portion 1240 may include a plurality of coils 1241b and 1243b for driving the lens module 1200. The plurality of coils 1141b, 1143b, 1145b, 1241b, and 1243b may be mounted on a main substrate 1070 and the main substrate 1070 may be mounted on the housing 1010. Accordingly, the housing 1010 may include a plurality of through-holes 1015, 1016, 1017, 1018, and 1019 to expose the plurality of coils 1141b, 1143b, 1145b, 1241b, and 1243b to an internal space of the housing 1010.

The main substrate 1070 on which the plurality of coils 1141b, 1143b, 1145b, 1241b, and 1243b are mounted to be provided in an integrated form. In this case, as one terminal may be provided, external power and an external signal may be easily connected. However, an embodiment thereof is not limited thereto. A plurality of the main substrates 1070 may be provided by separately providing a substrate on which coils for the reflective module 1100 are mounted and a substrate on which coils for the lens module 1200 are mounted.

The reflective module 1100 may alter a path of light incident through an opening 1031. When an object is imaged or a video is taken, an image or a video may be blurred by shaking of a user's hand, or for other reasons. In this case, the reflective module 1100 may calibrate the shaking of a user's hand by moving a rotation holder 1120 on which the reflective module 1100 is mounted. For example, when an image or a video is blurred by shaking of a user's hand, the shaking may be compensated for by providing a relative displacement corresponding to the shaking to the rotation holder 1120.

In an example, as a lens are not included, an OIS function may be implemented by moving the rotation holder 1120 having a relatively light weight, thereby significantly reducing power consumption.

Thus, to implement an OIS function, a moving direction of light may be altered by moving the moving holder 1120 including the reflective module 1100 rather than moving a lens barrel or an image sensor including a plurality of lenses such that calibrated light in which the handshaking, and the like, are calibrated may be incident to the lens module 1200.

The reflective module 1100 may include a rotation holder 1120 provided in and supported by the housing 1010, a reflective module 1100 mounted on the rotation holder 1120, and a first driving portion 1140 moving the rotation holder 1120.

The reflective module 1100 may alter a moving direction of light. For example, the reflective module 1100 may be implemented as a mirror or a prism reflecting light (for ease of description, in the diagram, the reflective module 1100 may be implemented as a prism).

The reflective module 1100 may be fixed to the rotation holder 1120. The rotation holder 1120 may include a mounting surface 1123 on which the reflective module 1100 is mounted.

The mounting surface 1123 of the rotation holder 1120 may be configured to be an inclined surface to alter a path of light. For example, the mounting surface 1123 may be configured as an inclined surface inclined by 30 to 60 degrees with reference to an optical axis (Z axis) of a plurality of lenses. The inclined surface of the rotation holder 1120 may be directed to the opening 1031 of a cover 1030 through which light is incident.

The rotation holder 1120 is mounted in the housing 1010 and may be moveably accommodated in an internal space of the housing 1010, as described below. For example, the rotation holder 1120 may be accommodated in the housing 1010 and may rotate with reference to a first axis (X axis) and a second axis (Y axis). The first axis (X axis) and the second axis (Y axis) may be axes perpendicular to the optical axis (Z axis), and the first axis (X axis) and the second axis (Y axis) may be perpendicular to each other.

The rotation holder 1120 may be supported by the housing 1010 by first ball bearings 1131 aligned along the first axis (X axis) and second ball bearings 1133 aligned along the second axis (Y axis) to smoothly rotate to the first axis (X axis) and the second axis (Y axis). In the diagram, as an example, two first ball bearings 1131 aligned along the first axis (X axis) and two second ball bearings 1133 aligned along the second axis (Y axis) may be provided. The rotation holder 1120 may rotate with reference to a first axis (X axis) and a second axis (Y axis) by a first driving portion 1140.

The first ball bearings 1131 and the second ball bearings 1133 may be provided on a front surface and a rear surface of the rotation plate 1130, respectively. In another example, the first ball bearings 1131 and the second ball bearings 1133 may be provided on a rear surface and a front surface of the rotation plate 1130, respectively. Accordingly, the first ball bearings 1131 may be aligned along the second axis (Y axis) and the second ball bearing 1133 may be aligned along the first axis (X axis); in the description below, the example illustrated in the diagram will be described for ease of description, and the rotation plate 1130 may be provided between the rotation holder 1120 and an internal side surface of the housing 1010. The rotation holder 1120 may be supported by the housing 1010 by means of the rotation plate 1130 by attractive force of a pulling magnet 1151 provided in the rotation holder 1120, or a pulling yoke, and of a pulling yoke 1153 provided in the housing 1010, or a pulling magnet (also, the first ball bearings 1131 and the second ball bearings 1133 may be provided between the rotation holder 1120 and the housing 1010).

Seating grooves 1132 and 1134 may be provided on a front surface and a rear surface of the rotation plate 1130, and the first ball bearings 1131 and the second ball bearings 1133 may be inserted into the seating grooves 1132 and 1134. The seating grooves 1132 and 1134 may include the first seating grooves 1132 into which the first ball bearings 1131 are partially inserted, and the second seating grooves 1134 into which the second ball bearings 1133 are partially inserted.

A third seating groove 1021 may be provided in the housing 1010, and the first ball bearing 1131 may be partially inserted into the third seating groove 1021, and a fourth seating groove 1121 may be provided in the rotation holder 1120, and the second ball bearing 1133 may be partially inserted into the fourth seating groove 1121.

Each of the first seating groove 1132, the second seating groove 1134, the third seating groove 1021, and the fourth seating groove 1121 may be configured to have a semi-spherical shape or a polygonal shape such as a polyprismatic-shaped groove or a polypyramid-shaped groove, for easy rotation of the first ball bearing 1131 and the second ball bearing 1133, a depth of the grooves may be configured to be less than a radius of the groove. In an example, the first ball bearing 1131 and the second ball bearing 1133 is not=entirely inserted into the grooves but is partially exposed such that the rotation plate 1130 and the rotation holder 1120 may easily rotate. Also, the positions and the numbers of the first seating groove 1132, the second seating groove 1134, the third seating groove 1021, and the fourth seating groove 1121 may correspond to the positions and the numbers of the first ball bearings 1131 aligned along the first axis (X axis) and the second ball bearings 1133 aligned along the second axis (Y axis).

The first ball bearings 1131 and the second ball bearings 1133 may roll or may slide in the first seating groove 1132, the second seating groove 1134, the third seating groove 1021, and the fourth seating groove 1121 and may work as bearings.

The first ball bearings 1131 and the second ball bearings 1133 may be configured to be fixed to at least one of the housing 1010, the rotation plate 1130, and the rotation holder 1120. For example, the first ball bearings 1131 may be provided in and fixed to the housing 1010 or the rotation plate 1130, and the second ball bearings 1133 may be provided in and fixed to the rotation plate 1130 or the rotation holder 1120. In this case, a groove may only be provided in a member opposing the member to which the first ball bearing 1131 or the second ball bearing 1133 is fixed, and the ball bearing may work as friction bearings by sliding of the ball bearings rather than by rotation of the ball bearings.

When the first ball bearings 1131 and the second ball bearings 1133 are provided in and fixed to one of the housing 1010, the rotation plate 1130, and the rotation holder 1120, the first ball bearing 1131 or the second ball bearing 1133 may be configured to have a spherical shape or a semi-spherical shape (however, an example of the shape is not limited thereto, and the first ball bearing 1131 or the second ball bearing 1133 may be configured to have a protrusion length greater or smaller than that of a semi-sphere).

The first ball bearing 1131 and the second ball bearing 1133 may be separately manufactured, and may be attached to one of the housing 1010, the rotation plate 1130, and the rotation holder 1120. In another example, the first ball bearings 1131 and the second ball bearings 1133 may be provided in an integrated form when the housing 1010, the rotation plate 1130, and the rotation holder 1120 are manufactured.

The first driving portion 1140 may produce driving force to rotate the first driving portion 1140 with reference to two axes.

As an example, the first driving portion 1140 may include a plurality of magnets 1141a, 1143a, and 1145a, and a plurality of coils 1141b, 1143b, and 1145b opposing the plurality of magnets 1141a, 1143a, and 1145a.

When power is applied to the plurality of coils 1141b, 1143b, and 1145b, the rotation holder 1120 on which the plurality of magnets 1141a, 1143a, and 1145a are mounted may rotate with reference to the first axis (X axis) and a second axis (Y axis) by electromagnetic force produced between the plurality of magnets 1141a, 1143a, and 1145a and the plurality of coils 1141b, 1143b, and 1145b.

The plurality of magnets 1141a, 1143a, and 1145a may be mounted on the rotation holder 1120. As an example, one of the plurality of magnets 1141a, 1143a, and 1145a, the magnet 1141a, may be mounted on a bottom surface of the rotation holder 1120, and the other magnets 1143a and 1145a may be mounted on a side surface of the rotation holder 1120.

The plurality of coils 1141b, 1143b, and 1145b may be mounted on the housing 1010. As an example, the plurality of coils 1141b, 1143b, and 1145b may be mounted on the housing 1010 by means of a main substrate 1070. Accordingly, the plurality of coils 1141b, 1143b, and 1145b may be provided on the main substrate 1070, and the main substrate 1070 may be mounted on the housing 1010. In the example illustrated in the diagram, the main substrate 1070 may be provided in an integrated form such that both coils for the reflective module 1100 and coils for the lens module 1200 may be mounted on the main substrate 1070, but an example thereof is not limited thereto. The main substrate 1070 may be divided into two substrates on which coils for the reflective module 1100 and coils for the lens module 1200 are separately mounted.

A reinforcing plate (not illustrated) may be mounted on a lower portion of the main substrate 1070.

In the example, a closed-loop control method of sensing a position of the rotation holder 1120 and providing feedback of the sensing when the rotation holder 1120 rotates may be used.

Accordingly, to perform the closed-loop control, position sensors 1141c and 1143c may be provided. In an example, the position sensors 1141c and 1143c may be implemented by hall-sensors.

The position sensors 1141c and 1143c may be disposed in internal regions or external regions of the coils 1141b and 1143b, respectively, and the position sensors 1141c may be mounted on the main substrate 1070 on which the coils 1141b and 1143b are mounted.

A gyro sensor (not illustrated) sensing a factor of shaking such as shaking of a user's hand may be provided on the main substrate 1070, and a driving circuit device (a driver IC; not illustrated) providing a driving signal to the plurality of coils 1141b, 1143b, and 1145b may be provided on the main substrate 1070.

A path of light may be altered by the reflective module 1100, and the light with the altered path may be incident to the lens module 1200. Accordingly, a plurality of stacked lenses provided in the lens module 1200 may be aligned along a Z axis, a direction in which light is emitted, in the reflective module 1100. Also, the lens module 1200 may include a second driving portion 1240 to implement an AF function, a zoom function, and the like. To implement an AF function and a zoom function, components for image stabilization function may not be included, and accordingly, the lens module 1200 having a relatively light weight may move in an optical axis direction, thereby significantly reducing power consumption.

The lens module 1200 may include a lens holder 1220 provided in an internal space of the housing 1010 and including stacked lenses therein, and the second driving portion 1240 moving the lens holder 1220.

A plurality of lenses imaging an object may be accommodated in the lens holder 1220, and may be mounted in the lens holder 1220 along an optical axis.

Light of which a moving direction is altered by the reflective module 1100 may pass through the plurality of lenses and may be refracted. The optical axis (Z axis) of the plurality of lenses may be formed perpendicularly to a thickness direction (Y axis direction) of the lens module 1200.

The lens holder 1220 may be configured to move in the optical axis (Z axis) direction to perform an AF function. As an example, the lens holder 1220 may be configured to move in a direction (including an opposite direction) in which light of which a moving direction is altered by the reflective module 1100 passes through the plurality of lenses.

The second driving portion 1240 may produce driving force to move the lens holder 1220 in the optical axis (Z axis) direction. The second driving portion 1240 may move the lens holder 1220 to change a distance between the lens holder 1220 and the reflective module 1100.

As an example, the second driving portion 1240 may include a plurality of magnets 1241a and 1243a, and a plurality of coils 1241b and 1243b opposing the plurality of magnets 1241a and 1243a.

When power is applied to the plurality of coils 1241b and 1243b, the lens holder 1220 on which the plurality of magnets 1241a and 1243a are mounted may move in the optical axis (Z axis) direction by electromagnetic force produced between the plurality of magnets 1241a and 1243a and the plurality of coils 1241b and 1243b.

The plurality of magnets 1241a and 1243a may be mounted on the lens holder 1220. As an example, the plurality of magnets 1241a and 1243a may be mounted on a side surface of the lens holder 1220.

The plurality of coils 1241b and 1243b may be mounted on the housing 1010. As an example, the plurality of coils 1241b and 1243b may be mounted on the main substrate 1070, and the main substrate 1070 may be mounted on the housing 1010. For ease of description, in the example illustrated in the diagram, both coils for the reflective module 1100 and coils for the lens module 1200 may be mounted on the main substrate 1070, but an embodiment thereof is not limited thereto. The main substrate 1070 may be implemented as separate substrates on which coils for the reflective module 1100 and coils for the lens module 1200 are separately mounted.

In an example, a closed-loop control method of sensing a position of the lens holder 1220 and providing a feedback of the sensing when the lens holder 1220 moves may be used. Accordingly, a position sensor 1243c may be provided. In an example, the position sensor 1243c may be a hall sensor.

The position sensor 1243c may be disposed in an internal region or an external region of a coil 1243b, and the position sensor 1243c may be mounted on the main substrate 1070 on which the coil 1243b is mounted.

The lens holder 1220 may be provided in the housing 1010 and may move in the optical axis (Z axis) direction. As an example, a plurality of ball members 1250 may be provided between the lens holder 1220 and the housing 1010.

The plurality of ball members 1250 may work as a bearing for guiding movement of the lens holder 1220 while an AF function is performed, and may also maintain a gap between the lens holder 1220 and the housing 1010.

The plurality of ball members 1250 may roll in the optical axis (Z axis) direction when driving force working in the optical axis (Z axis) direction is produced. Accordingly, the plurality of ball members 1250 may guide movement of the lens holder 1220 in the optical axis (Z axis) direction.

A plurality of guiding grooves 1221 and 1231 in which the plurality of ball members 1250 are accommodated may be formed on at least one of surfaces of the housing 1010 opposing each other.

The plurality of ball members 1250 may be accommodated in the plurality of guiding grooves 1221 and 1231 and may be interposed between the lens holder 1220 and the housing 1010.

The plurality of guiding grooves 1221 and 1231 may be configured to have a length in the optical axis (Z axis) direction.

While the plurality of ball members 1250 are accommodated in the plurality of guiding grooves 1221 and 1231, movement of the plurality of ball members 1250 in the first axis (X axis) and a second axis (Y axis) may be limited, and the plurality of ball members 1250 may only move in the optical axis (Z axis) direction. As an example, the plurality of ball members 1250 may only roll in the optical axis (Z axis) direction.

Each of the plurality of guiding grooves 1221 and 1231 may be configured to be elongated in the optical axis (Z axis) direction. A cross-sectional surface of each of the plurality of guiding grooves 1221 and 1231 may be configured to have a rounded shape, a polygonal shape, or various other shapes.

The lens holder 1220 may be pushed towards the housing 1010 such that the plurality of ball members 1250 may continue to be in contact with the lens holder 1220 and the housing 1010.

To this end, a yoke 1260 may be mounted on the housing 1010, and the yoke 1260 may oppose the plurality of magnets 1241a and 1243a mounted on the lens holder 1220. The yoke 1260 may be formed of a magnetic material.

Attractive force may work between the yoke 1260 and the plurality of magnets 1241a and 1243a. Accordingly, the lens holder 1220 may move in the optical axis (Z axis) direction by driving force of the second driving portion 1240 while the lens holder 1220 is in contact with the plurality of ball members 1250.

Figure 17:
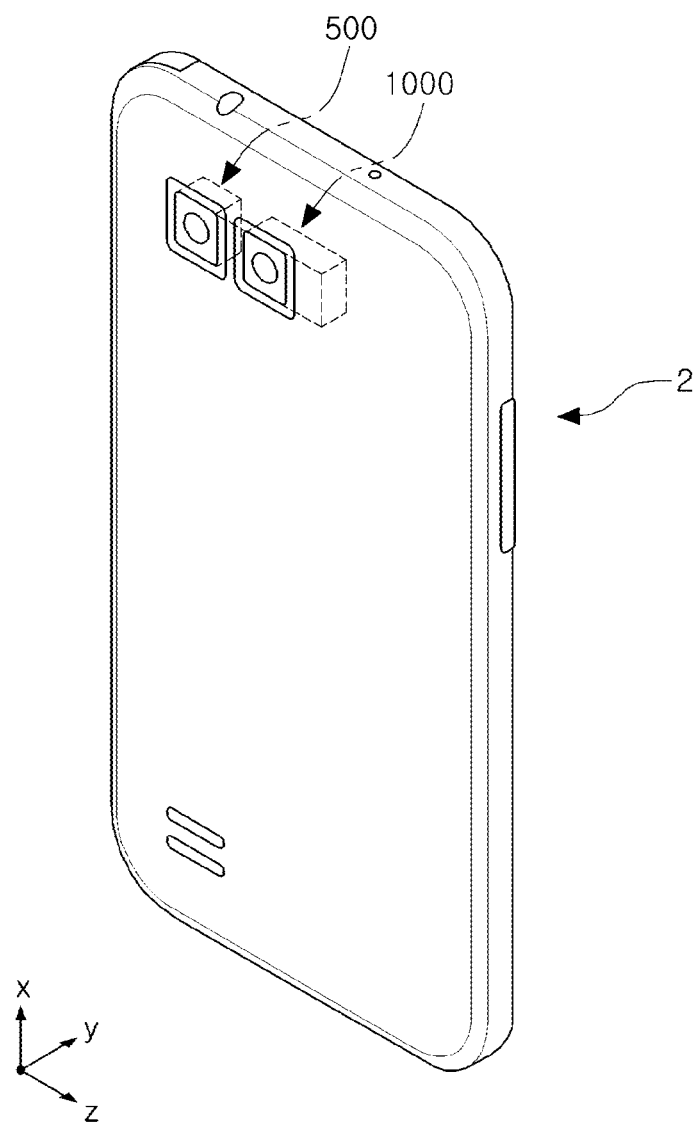
FIG. 17 is a diagram illustrating an example of a portable electronic device.

FIG. 17 is a diagram illustrating a portable electronic device according to an example.

Referring to FIG. 17, a portable electronic device 2 in the example may be implemented as a portable electronic device such as a mobile communication terminal device, a smartphone, a table PC, and the like, on which a plurality of camera modules 500 and 1000 are mounted.

In an example, the plurality of camera modules 500 and 1000 may be mounted on the portable electronic device 2.

At least one of the plurality of camera modules 500 and 1000 may be implemented by the camera module 1000 described in the aforementioned embodiments with reference to FIGS. 2 to 16.

In the case of a portable electronic device including a dual camera module, at least one of the two camera modules may be implemented by the camera module 1000 described in the aforementioned embodiments.

According to the aforementioned examples, a camera module and a portable electronic device may implement an autofocusing function, a zoom function, an image stabilization function, and may have a simplified structure and a reduced size.

According to the aforementioned examples, there is provided a camera module that significantly reduces power consumption and a portable electronic device including the same.

According to the aforementioned examples, there is provided a folded module with increased cohesion stiffness between components such that product reliability may improve.

According to the aforementioned examples, the camera module and the portable electronic device including the same may implement functions, such as, for example, an AF function, a zoom function, and an OIS function, and each may have a simplified structure and a reduced size. Power consumption may also be significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A folded module, comprising:
    a housing comprising a protruding wall protruding in a direction perpendicular to an optical axis direction;
    a rotation holder comprising a reflective member, and supported by an internal wall of the housing with a rotation plate interposed therebetween to be disposed inside the housing; and
    a stopper coupled to the protruding wall, and being configured to limit movement of the rotation holder in the optical axis direction,
    wherein the stopper comprises:
        a contact portion in contact with the rotation holder;
        a curved portion extending from the contact portion and being curved to surround an upper portion of the protruding wall;
        a trap portion extending from the curved portion, opposite the contact portion, and including a part extending in a direction towards the contact portion; and
        a separation prevention structure disposed in the contact portion or the trap portion.

2. The folded module of claim 1, wherein the separation prevention structure comprises a first fixed portion in which an end portion of the trap portion is curved towards the protruding wall and a first fixing groove provided in the protruding wall, and the first fixed portion is inserted into the first fixing groove.

3. The folded module of claim 2, wherein the first fixed portion is compressively adhered to the first fixing groove.

4. The folded module of claim 1, wherein the separation prevention structure comprises a second fixed portion in which an end portion of the contact portion is curved towards the protruding wall and a second fixing groove provided in the protruding wall, and the second fixed portion is inserted into the second fixing groove.

5. The folded module of claim 4, wherein the second fixed portion is compressively adhered to the second fixing groove.

6. The folded module of claim 1, wherein the separation prevention structure comprises a third fixed portion in which an end portion of the contact portion is inserted into the bottom of the housing.

7. The folded module of claim 6,
    wherein the housing comprises a third fixing groove in the bottom of the housing, and
    wherein the third fixed portion is compressively inserted into the third fixing groove.

8. The folded module of claim 6,
    wherein the housing comprises a third fixing groove in the bottom of the housing, and
    wherein the third fixed portion is configured to slide into and be coupled to the third fixing groove.

9. The folded module of claim 8, wherein the third fixed portion and the third fixing groove are coated with an adhesive and are bonded to each other.

10. The folded module of claim 2, wherein the separation prevention structure comprises the second fixed portion in which an end portion of the contact portion is curved towards the protruding wall and the second fixing groove provided in the protruding wall, and the second fixed portion is inserted into the second fixing groove.

11. The folded module of claim 10, wherein the second fixed portion is compressively adhered to the second fixing groove.

12. The folded module of claim 2, wherein the separation prevention structure comprises the third fixed portion in which an end portion of the contact portion is inserted into the bottom of the housing.

13. The folded module of claim 12,
    wherein the housing further comprises the third fixing groove in the bottom of the housing, and
    wherein the third fixed portion is compressively coupled to the third fixing groove, or slides into and is coupled to the third fixing groove.

14. The folded module of claim 1, wherein the separation prevention structure comprises:
    a first fixing groove provided in the protruding wall, and an end portion of the trap portion is curved to be inserted into the first fixing groove; and
    a second fixing groove provided in the protruding wall, and an end portion of the contact portion is curved to be inserted into the second fixing groove.

* * * * *